US010713793B2

(12) United States Patent
Sasaki

(10) Patent No.: US 10,713,793 B2
(45) Date of Patent: Jul. 14, 2020

(54) IMAGE PROCESSING APPARATUS, IMAGE PROCESSING METHOD, AND RECORDING MEDIUM

(71) Applicant: CASIO COMPUTER CO., LTD., Shibuya-ku, Tokyo (JP)

(72) Inventor: Kyosuke Sasaki, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 110 days.

(21) Appl. No.: 15/822,800

(22) Filed: Nov. 27, 2017

(65) Prior Publication Data

US 2018/0158191 A1    Jun. 7, 2018

(30) Foreign Application Priority Data

Dec. 2, 2016  (JP) ................................. 2016-234845

(51) Int. Cl.
*G06T 7/11*        (2017.01)
*G06K 9/00*       (2006.01)
(Continued)

(52) U.S. Cl.
CPC ............ *G06T 7/11* (2017.01); *G06K 9/00248* (2013.01); *G06K 9/00281* (2013.01); *G06K 9/4642* (2013.01); *G06K 9/6202* (2013.01); *G06T 5/00* (2013.01); *G06T 2207/20021* (2013.01); *G06T 2207/30088* (2013.01); *G06T 2207/30201* (2013.01)

(58) Field of Classification Search
CPC ............ G06T 7/11; G06T 2207/30201; G06K 9/00248; G06K 9/6202; G06K 9/00281
See application file for complete search history.

(56) References Cited

U.S. PATENT DOCUMENTS

| 7,233,693 B2 * | 6/2007 | Momma | A61B 5/0064 |
| | | | 382/162 |
| 7,324,668 B2 * | 1/2008 | Rubinstenn | A45D 44/005 |
| | | | 382/118 |
| 7,756,343 B2 | 7/2010 | Li et al. | |

FOREIGN PATENT DOCUMENTS

| JP | 2003187251 A | 7/2003 |
| JP | 2004321793 A | 11/2004 |
| | (Continued) | |

OTHER PUBLICATIONS

Japanese Office Action (and English language translation thereof) dated Nov. 5, 2019 issued in Japanese Application No. 2016-234846.

(Continued)

*Primary Examiner* — Ruiping Li
(74) *Attorney, Agent, or Firm* — Holtz, Holtz & Volek PC

(57) ABSTRACT

An image capture apparatus 1 is provided with a skin score calculation processing unit 53. The skin score calculation processing unit 53 segments a face region of a person included in an image into a plurality of segmented regions having a uniform size in a predetermined proportion to a size of the face region. Further, the skin score calculation processing unit 53 measures luminance values of a predetermined number of pixels, respectively. Further, the skin score calculation processing unit 53 determines a condition of at least any one of pores and freckles in the face region, based on a distribution condition of the luminance values measured in the segmented region, for each of the segmented regions segmented.

8 Claims, 6 Drawing Sheets

(51) Int. Cl.
*G06K 9/62* (2006.01)
*G06K 9/46* (2006.01)
*G06T 5/00* (2006.01)

(56) References Cited

FOREIGN PATENT DOCUMENTS

| | | |
|---|---|---|
| JP | 2007087234 A | 4/2007 |
| JP | 2013171511 A | 9/2013 |

OTHER PUBLICATIONS

Tezuka, et al., "Skin Check Technology Using Smartphones", Fujitsu, Japan, Fujitsu Limited, Jan. 10, 2013, vol. 64, No. 1, pp. 59-65.

* cited by examiner

[EVALUATION REGION RA]

[EVALUATION REGION RB]

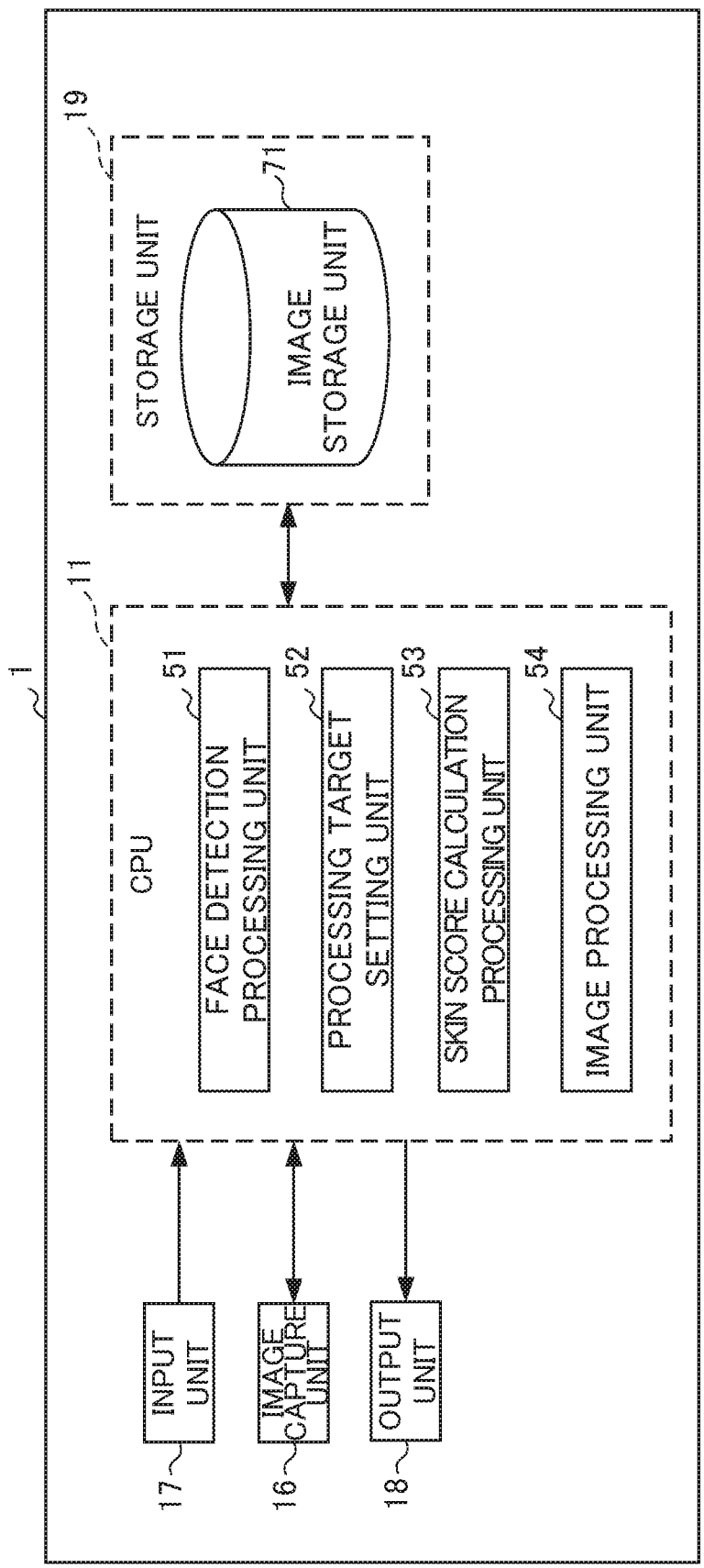

IMAGE PROCESSING APPARATUS, IMAGE PROCESSING METHOD, AND RECORDING MEDIUM

This application is based on and claims the benefit of priority from Japanese Patent Application No. 2016-234845, filed on 2 Dec. 2016, the content of which is incorporated herein by reference.

BACKGROUND OF THE INVENTION

Field of the Invention

The present invention relates to an image processing apparatus, an image processing method, and a recording medium.

Related Art

Heretofore, an image capture apparatus for performing a beautiful skin process on a face region of an image has been known. Such an image capture apparatus is configured to be able to set an intensity level of a beautiful skin process in accordance with user preference; however, since an intensity level considered to be appropriate varies depending on the skin condition, it is difficult for an ordinary user to perform an appropriate setup. Meanwhile, as disclosed in Japanese Unexamined Patent Application, Publication No. 2007-087234, a technology to observe a specific skin condition such as freckles and pores by appressing a device itself to the skin has been known.

SUMMARY OF THE INVENTION

An image processing apparatus of the present invention is provided with: a segmentation unit that segments a face region of a person included in an image into a plurality of segmented regions having a uniform size in a predetermined proportion to a size of the face region; a measurement unit that measures luminance values of a predetermined number of pixels, respectively; and a determination unit that determines a condition of at least any one of pores and freckles in the face region, based on a distribution condition of the luminance values in the segmented region measured by the measurement unit, for each of the segmented regions segmented by the segmentation unit. An image processing apparatus of the present invention is provided with: a segmentation unit that segments a face region of a person included in an image into segmented regions having a size in a predetermined proportion to a size of the face region; a measurement unit that measures luminance values of a predetermined number of pixels, respectively; and an identification unit that identifies a size of a predetermined proportion segmented by the segmentation unit, in accordance with a value for determining at least any one of pores and freckles in the face region, wherein the value for determination is a value indicating a predetermined proportion of a size of a continuous range which have a luminance value measured by the measurement unit is not more than a predetermined threshold value in a segmented region. An image processing method of the present invention is provided with: a segmentation process of segmenting a face region of a person included in an image into a plurality of segmented regions having a uniform size in a predetermined proportion to a size of the face region; a measurement process of measuring luminance values of a predetermined number of pixels, respectively; and a determination process of determining a condition of at least any one of pores and freckles in the face region, based on a distribution condition of the luminance values in the segmented regions measured in the measurement process, for each of the segmented region segmented in the segmentation process. An image processing method of the present invention is provided with: a segmentation process of segmenting a face region of a person included in an image into segmented regions having a size in a predetermined proportion to a size of the face region; a measurement process of measuring luminance values of a predetermined number of pixels, respectively; and an identification process of identifying a size of a predetermined proportion segmented in the segmentation process, in accordance with a value for determining at least any one of pores and freckles in the face region, wherein the value for determination is a value indicating a predetermined proportion of a size of a continuous range which have a luminance value measured by the measurement process is not more than a predetermined threshold value in a segmented region. The present invention is a computer-readable recording medium storing a program thereon for causing the computer to function as: a segmentation unit that segments a face region of a person included in an image into a plurality of segmented regions having a uniform size in a predetermined proportion to a size of the face region; a measurement unit that measures luminance values of a predetermined number of pixels, respectively; and a determination unit that determines a condition of at least any one of pores and freckles in the face region, based on a distribution condition of the luminance values in the segmented region measured by the measurement unit, for each of the segmented regions segmented by the segmentation unit. The present invention is a computer-readable recording medium storing a program thereon for causing the computer to function as: a segmentation unit that segments a face region of a person included in an image into segmented regions having a size in a predetermined proportion to a size of the face region; a measurement unit that measures luminance values of a predetermined number of pixels, respectively; and an identification unit that identifies a size of a predetermined proportion segmented by the segmentation unit, in accordance with a value for determining at least any one of pores and freckles in the face region, wherein the value for determination is a value indicating a predetermined proportion of a size of a continuous range which have a luminance value measured by the measurement unit is not more than a predetermined threshold value in a segmented region.

BRIEF DESCRIPTION OF THE DRAWINGS

FIG. 4 is a functional block diagram illustrating a functional configuration for executing a secondary beautiful skin process, in relation to the functional configuration of the image capture apparatus 1 in FIG. 1;

DETAILED DESCRIPTION OF THE INVENTION

An embodiment of the present invention will be described below by using the drawings.

Figure 1:
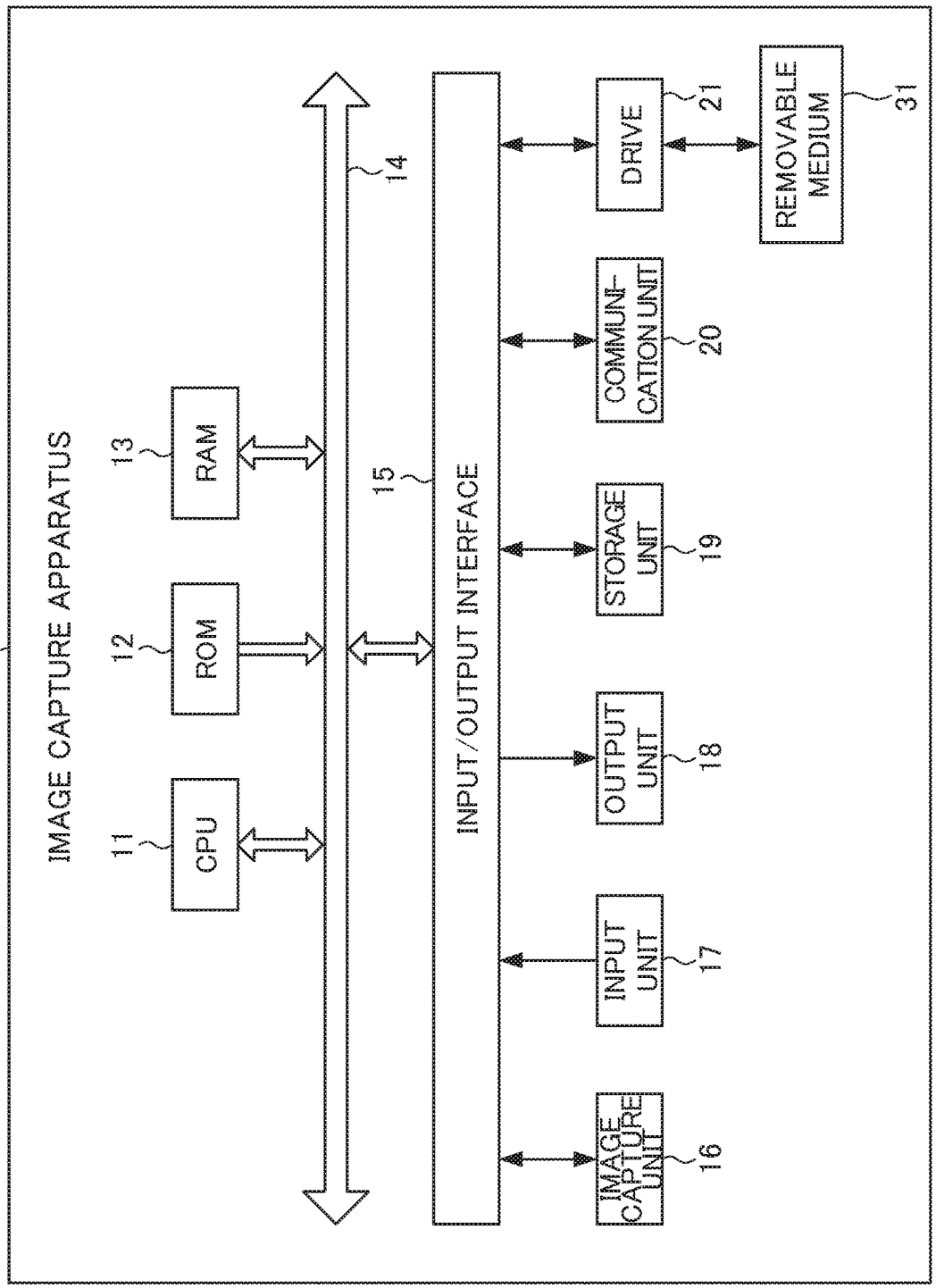
FIG. 1 is a block diagram illustrating a hardware configuration of an image capture apparatus 1 according to an embodiment of the present invention.

FIG. 1 is a block diagram showing the hardware configuration of an image capture apparatus 1 as an embodiment of a detection apparatus according to the present invention. The image capture apparatus 1 is configured as, for example, a digital camera.

The image capture apparatus 1 includes a CPU (Central Processing Unit) 11, ROM (Read Only Memory) 12, RAM (Random Access Memory) 13, a bus 14, an input/output interface 15, an image capture unit 16, an input unit 17, an output unit 18, a storage unit 19, a communication unit 20, and a drive 21.

The CPU 11 executes various processing according to programs that are recorded in the ROM 12, or programs that are loaded from the storage unit 20 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit and an image sensor, which are not illustrated.

In order to photograph a subject, the optical lens unit is configured by a lens such as a focus lens and a zoom lens for condensing light. The focus lens is a lens for forming an image of a subject on the light receiving surface of the image sensor. The zoom lens is a lens that causes the focal length to freely change in a certain range. The optical lens unit also includes peripheral circuits to adjust setting parameters such as focus, exposure, white balance, and the like, as necessary.

The image sensor is configured by an optoelectronic conversion device, an AFE (Analog Front End), and the like. The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE. The AFE executes a variety of signal processing such as A/D (Analog/Digital) conversion processing of the analog signal. The variety of signal processing generates a digital signal that is output as an output signal from the image capture unit 16 and is supplied to the CPU 11, an image processing unit (not illustrated), and the like as appropriate.

The input unit 17 is configured by various buttons and the like, and inputs a variety of information in accordance with instruction operations by the user. The output unit 18 is configured by the display unit, a speaker, and the like, and outputs images and sound. The storage unit 19 is configured by DRAM (Dynamic Random Access Memory) or the like, and stores data of various images. The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

The image capture apparatus 1 as thus constituted has a function capable of setting up parameters for a beautiful skin process in accordance with specific skin conditions such as pores and freckles.

Specifically, in the present embodiment, pores and freckles in a predetermined region of the face are evaluated as specific skin conditions; and the level of the specific conditions is calculated. In addition, a calculation result is used as a parameter for the beautiful skin process.

Figure 2A:
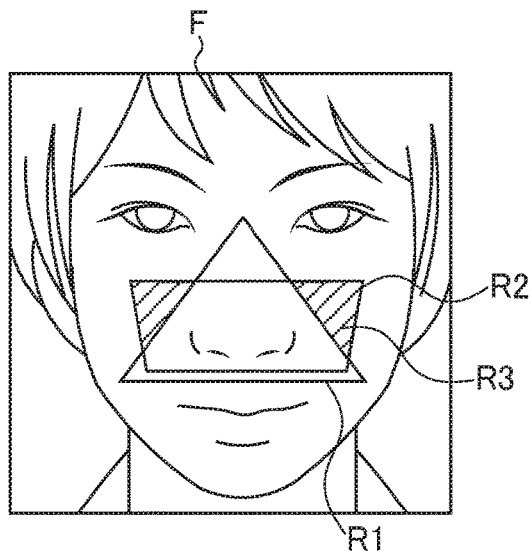
FIG. 2A is a schematic diagram for illustrating evaluation regions (standard evaluation region R10 and extended evaluation region R11), and is a diagram indicating a standard region.

FIGS. 2A to 2D are schematic diagrams for illustrating evaluation regions (standard evaluation region R10 and extended evaluation region R11) to be described later. The evaluation region (hereinafter referred to as "standard region") is a region between the eyes and the mouth, excluding a region around the nose, and excluding regions shadowed due to irradiation of light, e.g. dark circles under the eyes, relief of the nose, glasses, wrinkles, etc. Specifically, as illustrated in FIG. 2A, the standard region is a region R3 minus a region R1 around the nose, in a region R2 between the eyes and the mouth.

Figure 2B:
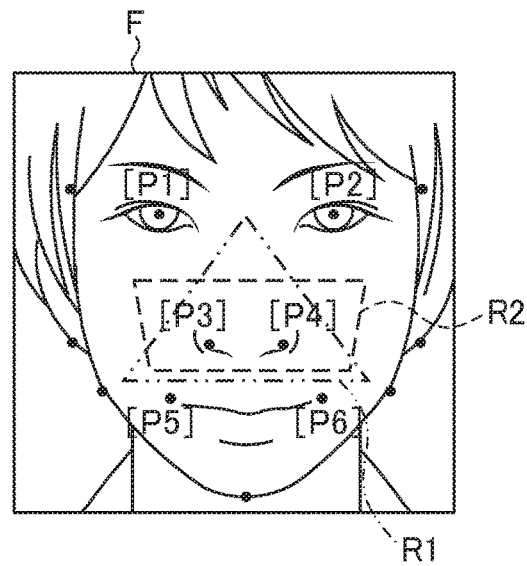
FIG. 2B is schematic diagram illustrating evaluation regions, and is a diagram indicating a state where a detection result has been output.

As illustrated in FIG. 2B, as a result of face detection from a face image, a frame F surrounding a region identified as a face (hereinafter referred to as "face frame"), eye coordinates P1, P2, nose coordinates P3, P4, and mouth coordinates P5, P6 are output as a detection result. The standard region R3 is a region excluding the substantially triangular region R1 around the nose from the substantially trapezoidal region R2 between the eyes and the mouth, which are determined based on the eye coordinates P1, P2, the nose coordinates P3, P4, and the mouth coordinates P5, P6. Note that various publicly known face detection technologies can be used for face detection capable of detecting the face frame F, the eye coordinates P1, P2, the nose coordinates P3, P4, and the mouth coordinates P5, P6.

Figure 2C:
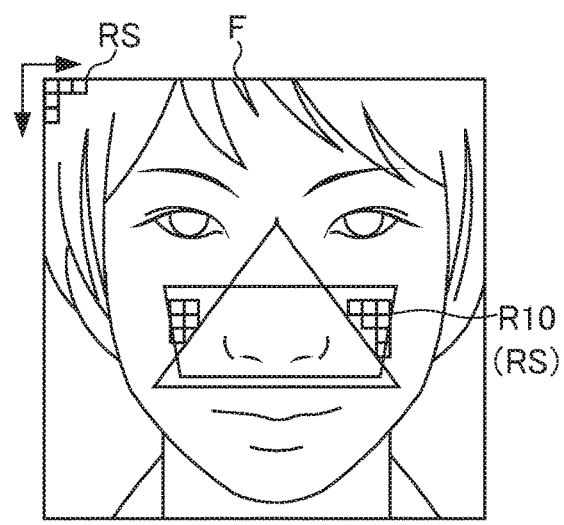
FIG. 2C is a schematic diagram illustrating evaluation regions, and is a diagram indicating a state where a rectangular region having a predetermined size has been set up.

Further, the region targeted for evaluation is not the entirety of the standard region R3, but rectangular regions (hereinafter referred to as "evaluation regions") having a predetermined size, arranged in the standard region R3, as illustrated in FIG. 2C. The evaluation regions are adjusted in size to allow freckles to be detected and be unlikely to cause erroneous determination. In the present embodiment, the evaluation regions correspond to thirty-two (32) rectangular segmented regions RS that are set up in the face frame F. In order to allocate the inside of the standard region R3 to the segmented regions RS, determination is made on whether an RS is in the inside or outside of the standard region R3. Available techniques to determine whether predetermined coordinates belong to the inside of the standard region R3 are, for example, a technique to calculate the number of intersections from a point to a half line, a technique to calculate the sum of angles made by a point and a side, a technique to calculate from an outer product of vectors of a region, etc.; however, publicly known various techniques to determine an inside or outside of a region can be used.

Figure 2D:
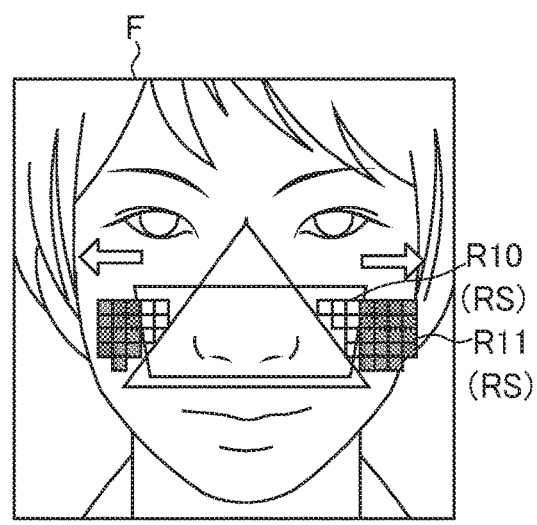
FIG. 2D is a schematic diagram illustrating evaluation regions, and is a diagram indicating a state where the evaluation regions have been extended.

Further, in the present embodiment, in order to further enhance the accuracy of a result of evaluating a skin condition, as illustrated in FIG. 2D, the evaluation region can be extended by extending the evaluation regions in the standard region R3 laterally (in a direction horizontal to the eyes). In the following, a segmented region R10 (RS) belonging to the standard region R3 and targeted for evaluation is referred to as "standard evaluation region"; and a segmented region R11 (RS) belonging to the region extended from the standard evaluation region R10 and targeted for evaluation is referred to as "extended evaluation region". Further, the standard evaluation region R10 and the extended evaluation region R11 are simply referred to as "evaluation region", when the regions do not need to be separately described.

When determining an evaluation region targeted for evaluation (standard evaluation region, extended evaluation region), in the case of the standard evaluation region, a standard evaluation region having a standard deviation value within a predetermined range is targeted for evaluation. Specifically, when the standard deviation is small, the skin will be smooth, and when the standard deviation is large, pores and freckles cannot correctly be analyzed due to external factors such as contrast of light, hairs, and glasses; therefore, these are excluded from the evaluation target. Note that a standard deviation in the standard evaluation region is calculated by calculating a histogram from brightness in the standard evaluation region, in which the mode of the calculated histogram is at the center.

Further, in the case of the extended evaluation region, an extended evaluation region is targeted for evaluation, when the standard deviation thereof does not exceed a threshold value that is a mean value +α (in the present embodiment, for example, 3) of standard deviations in the standard evaluation region targeted for evaluation. In addition, in consideration of the processing load and processing time, in the case of the extended evaluation region, such regions can be configured to be targeted for evaluation, when the regions do not reach a predetermined number (in the present embodiment, for example, 50 regions). Note that, in the present embodiment, the above-described condition for determining whether an extended evaluation region should be added is referred to as "extended addition condition".

The evaluation regions targeted for evaluation (standard evaluation regions, extended evaluation regions) are binarized, based on the threshold value that is set up based on the histogram of brightness in each of the evaluation regions. Each region of continuous pixels binarized is identified, and such a continuous region is determined to be a region in which pores or freckles exist, in accordance with the size of the continuous region. Note that the threshold value is a value for correcting the difference of variability in the evaluation regions, and the binarization based on the threshold value allows a dark portion to be identified as a portion that is considered to be pores or freckles, without being influenced by environmental luminosity.

Extraction of a continuous region is performed by a so-called labeling process, in which the same label is assigned to continuous pixels in a predetermined condition (dark pixels). Note that various publicly known labeling technologies can be used for the labeling process. Further, in consideration of the processing load, the present embodiment employs a labeling process of merging in four directions, in which the same label is assigned to a portion continuing in any of four directions in an image, i.e. a vertical (upward and downward) direction and a horizontal (leftward and rightward) direction.

By way of the labeling process, pores or freckles are classified, in accordance with the size of the continuous region extracted. The size of the continuous region to be classified as pores or freckles falls within a predetermined range, and is defined to have the following relationship in size:
Minimum continuous regions determined to be pores <maximum continuous regions determined to be pores=minimum continuous regions determined to be freckles <maximum continuous regions determined to be freckles
Specifically, for example, the size can be defined as follows:
the minimum continuous region determined to be pores× 0.00032+α (in the present embodiment, 1);
the maximum continuous region determined to be pores× 0.01410;
the minimum continuous region determined to be freckles× 0.01410; and
the maximum continuous region determined to be freckles× 0.20000. Note that the value a in the minimum continuous region determined to be pores can be changed in accordance with the ISO film speed or noise level.

Figure 3A:
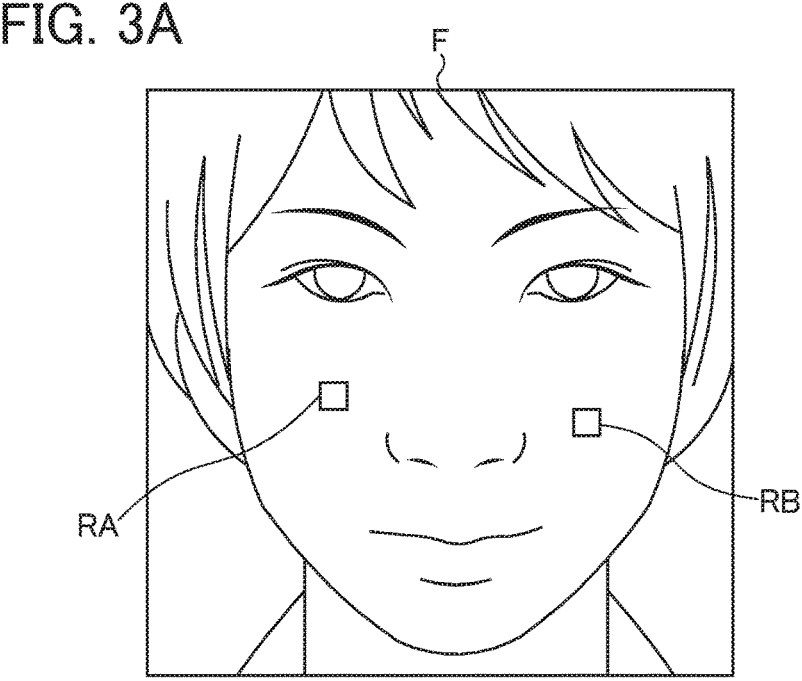
FIG. 3A is a schematic diagram illustrating a labeling result in the evaluation regions, and is a diagram indicating a state where an evaluation region RA and an evaluation region RB have been set up.
Figure 3B:
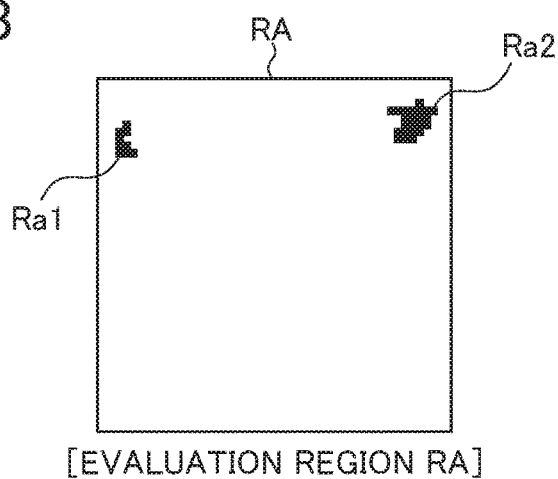
FIG. 3B is a schematic diagram illustrating a labeling result in the evaluation regions, and is a diagram indicating a result of performing a labeling process on the evaluation region RA.
Figure 3C:
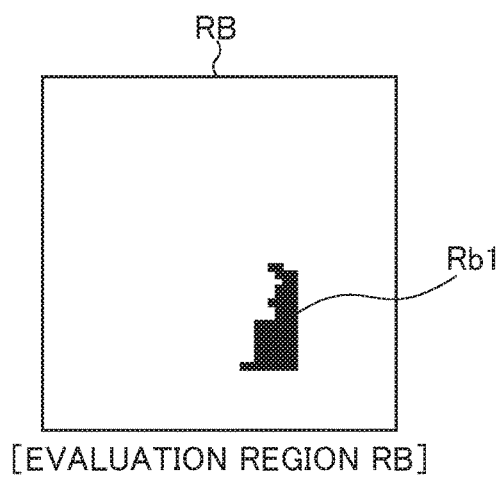
FIG. 3C is a schematic diagram illustrating a labeling result in the evaluation regions, and is a diagram indicating a result of performing a labeling process on the evaluation region RB.

FIGS. 3A to 3C are schematic diagrams illustrating a labeling result in the evaluation regions. As illustrated in FIG. 3A, brightness (Y) is extracted from YUV values of images of evaluation regions RA, RB targeted for evaluation, and is binarized by using a threshold value that is set up based on the histogram of brightness in the evaluation regions; and by performing the labeling process, as illustrated in FIGS. 3B and 3C, continuous regions Ra1, Ra2, Rb1 are extracted as spot regions and classified into pores or freckles, in accordance with the size of the spot. In the examples of FIGS. 3B and 3C, based on the sizes of the continuous regions, the continuous regions Ra1, Ra2 in the evaluation region RA are classified into pores; and the continuous regions Rb1 in the evaluation region RB are classified into freckles.

In each of the evaluation regions targeted for evaluation, the number of pores and freckles is counted; and scores by evaluation region, such as pore scores and freckle scores, are calculated. In addition, the pore scores and the freckle scores of all the evaluation regions targeted for evaluation are counted to calculate a synthesized score. Parameters for the beautiful skin process will be set up, based on the synthesized score calculated from the pore scores and freckle scores of the entire face.

FIG. 4 is a functional block diagram illustrating a functional configuration for executing a secondary beautiful skin process, in relation to the functional configuration of the image capture apparatus 1 in FIG. 0.1. The secondary beautiful skin process refers to a sequence of processes, in which, after the beautiful skin process, parameters for the beautiful skin process is set up, and an additional beautiful skin process is performed, in accordance with the pore scores and the freckle scores of the face calculated (skin scores).

When the secondary beautiful skin process is performed, as illustrated in FIG. 4, a face detection processing unit 51, a processing target setting unit 52, a skin score calculation processing unit 53, and an image processing unit 54 function in the CPU 11.

Further, an image storage unit 71 is set up in a region of the storage unit 19. The image storage unit 71 stores captured images photographed by the image capture unit 16 and data of images subjected to the beautiful skin process.

The face detection processing unit 51 performs a face detection process. Specifically, the face detection processing unit 51 acquires an image targeted for processing captured by the image capture unit 16, or an image targeted for processing from the image storage unit 71, and performs the face detection process. The face detection process is performed to detect the number of faces detected, a face frame F, coordinates of various facial features, such as the eye coordinates P1, P2, the nose coordinates P3, P4, and the mouth coordinates P5, P6, as illustrated in FIG. 2B.

The processing target setting unit 52 sets a processing target targeted for the processing of evaluating the skin conditions such as pores and freckles. Specifically, the processing target for the processing target setting unit 52 is a face having at least a predetermined size (in the present embodiment, 640×640 pixels); when at least a predetermined number of faces (in the present embodiment, three or more faces) are processed, a new processing target will not be set up.

The skin score calculation processing unit 53 performs a process involved with calculation of a skin score of each face (synthesized score of pores and freckles). Specifically, the skin score calculation processing unit 53 sets up a standard region that allows the skin condition to be appropriately acquired without shadows, etc. (the region between the eyes and the mouth, excluding the region around the nose), and allocates the segmented regions having a predetermined size (in the present embodiment, each size segmented into 32 pieces from the face frame) in the standard region. Among the plurality of segmented regions allocated, a region targeted for evaluation is set up as a standard evaluation region. In the present embodiment, the extended evaluation region having a size of the segmented regions is further set up by extending the standard evaluation region in the direction horizontal to the eyes. Further, the skin score calculation processing unit 53 binarizes the brightness in the evaluation regions (the standard evaluation region and the extended evaluation region targeted for evaluation), performs the labeling process, and classifies continuous dark regions into pores or freckles. Further, the skin score calculation processing unit 53 counts the number of pores and freckles classified by each region (scores by evaluation region), and calculates the number of pores and freckles in the face as a synthesized score (skin score).

The image processing unit 54 performs the beautiful skin process on an image. Specifically, the image processing unit 54 can perform a beautiful skin process of erasing pores, and a beautiful skin process of erasing freckles, and is configured to be able to set up a plurality of intensity levels of each process, depending on the degree thereof. The image processing unit 54 sets up parameters of intensity levels in accordance with the degree of the skin condition (synthesized score of pores and freckles), and performs the beautiful skin process. Specifically, the image processing unit 54 is configured to be able to perform the beautiful skin process at three different intensity levels of each of pores and freckles, and sets up a parameter corresponding to any one of the intensity levels in accordance with the degree of skin condition (synthesized score of pores and freckles) is set up.

Note that, in the present embodiment, although the image processing unit 54 performs the beautiful skin process beforehand, the beautiful skin process allows parameters to be set up at six different intensity levels; for example, the beautiful skin process is performed by using a parameter designated by scene or user designation. Even after performing the beautiful skin process, individual pores and freckles are different due to individual differences, etc.; therefore, in the present embodiment, an additional beautiful skin process is performed to remove pores and freckles. This allows for performing an additional beautiful skin process suitable for the face condition of the subject. Further, instead of performing the beautiful skin process beforehand, the beautiful skin process to remove pores and freckles may be performed on a captured image photographed by the image capture unit 16.

Figure 5:
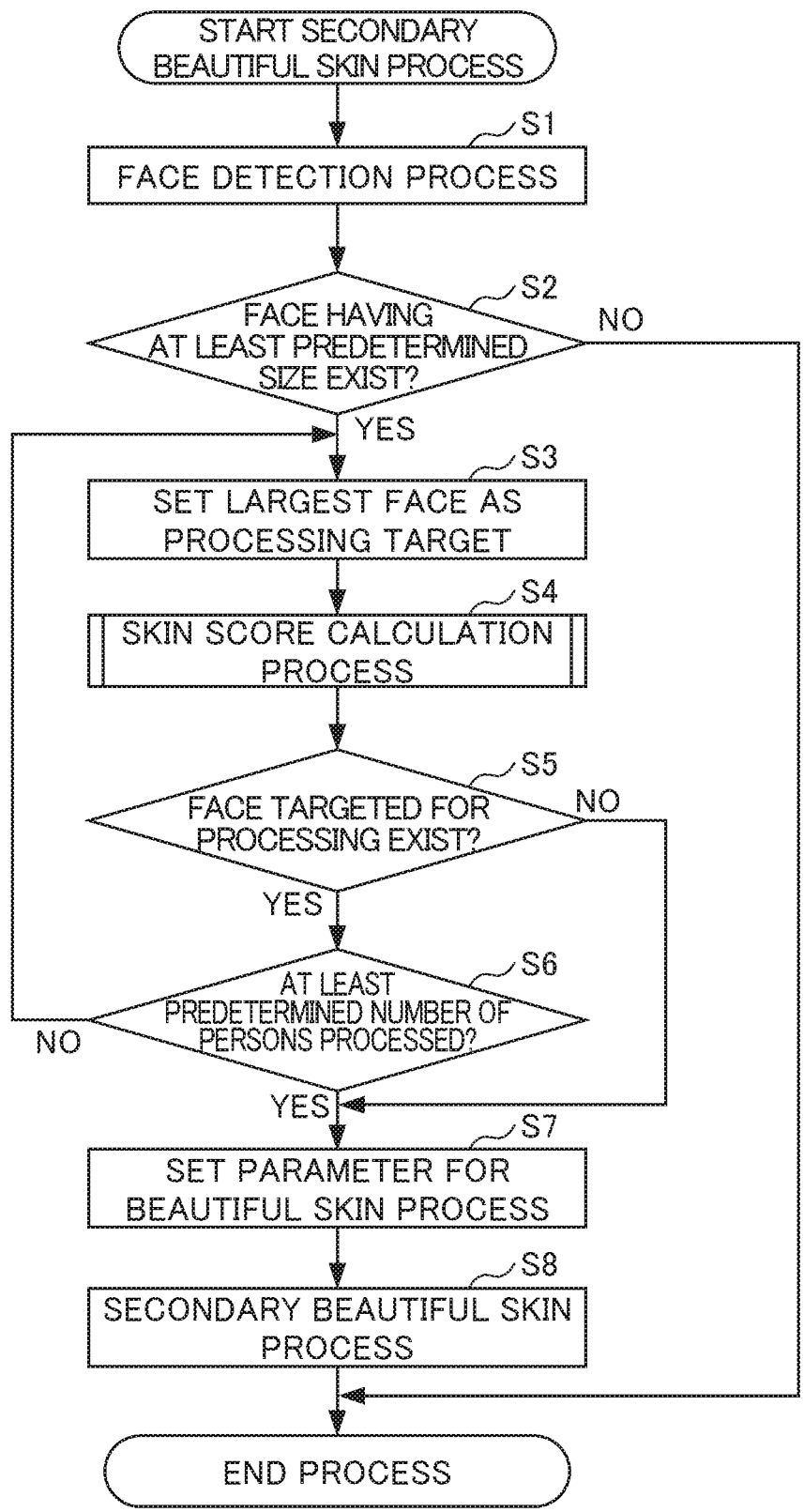
FIG. 5 is a flowchart illustrating a flow of the secondary beautiful skin process performed by the image capture apparatus 1 of FIG. 1 having the functional configuration of FIG. 4.

FIG. 5 is a flowchart illustrating a flow of the secondary beautiful skin process performed by the image capture apparatus 1 of FIG. 1 having the functional configuration of FIG. 4. The secondary beautiful skin process is performed after performing the beautiful skin process on a captured image photographed by the image capture unit 16, and is performed as a process to remove the pores and freckles afresh in accordance with the skin condition such as pores and freckles after the beautiful skin process. Note that the beautiful skin process, which is the stage prior to the secondary beautiful skin process, is started through a beautiful skin process start operation by a user via the input unit 17.

In Step S1, the face detection processing unit 51 acquires an image targeted for processing from the image storage unit 71, and performs the face detection process. As a result of performing the face detection process, the number of faces detected, the face frame F, the eye coordinates P1, P2, the nose coordinates P3, P4, and the mouth coordinates P5, P6, as illustrated in FIG. 2B, are detected.

In Step S2, the processing target setting unit 52 determines whether a face having at least a predetermined size exists. In the present embodiment, it is determined whether a face having a size of at least 640×640 pixels exists. If a face having at least a predetermined size does not exist, the determination in Step S2 is NO, and the process is finished. If a face having at least a predetermined size exists, the determination in Step S2 is YES, and the process advances to Step S3.

In Step S3, the processing target setting unit 52 sets a face having the largest size among the unprocessed faces as a processing target.

In Step S4, the skin score calculation processing unit 53 performs a skin score calculation process. As a result of performing the skin score calculation process, a skin score of the face targeted for processing (score of pores and freckles in each face) is calculated. The details of the skin score calculation process will be described later.

In Step S5, the processing target setting unit 52 determines whether a face targeted for processing exists, for example, whether a face having at least a predetermined size does not exist, a face itself does not exist, or the like. If a face targeted for processing does not exist, the determination in Step S5 is NO, and the process advances to Step S7. If a face targeted for processing exists, the determination in Step S5 is YES, and the process advances in Step S6.

In Step S6, the processing target setting unit 52 determines whether at least a predetermined number of faces have been processed (skin scores have been calculated). In the present embodiment, the predetermined number is three (3) persons. If the predetermined number of faces have not been processed, the determination in Step S6 is NO, and the process returns to Step S3. If the predetermined number of faces have been processed, the determination in Step S6 is YES and the process advances to Step S7.

In Step S7, the image processing unit 54 sets up parameters for the beautiful skin process, based on the skin scores calculated. For example, a parameter for pores and a parameter for freckles are set up for each face.

In Step S8, the image processing unit 54 performs an additional beautiful skin process, based on the parameters set up. When an image has been subjected to the additional beautiful skin process, the image will be stored in the image storage unit 71, or displayed on the output unit 18. Subsequently, the secondary beautiful skin process finishes.

Figure 6:
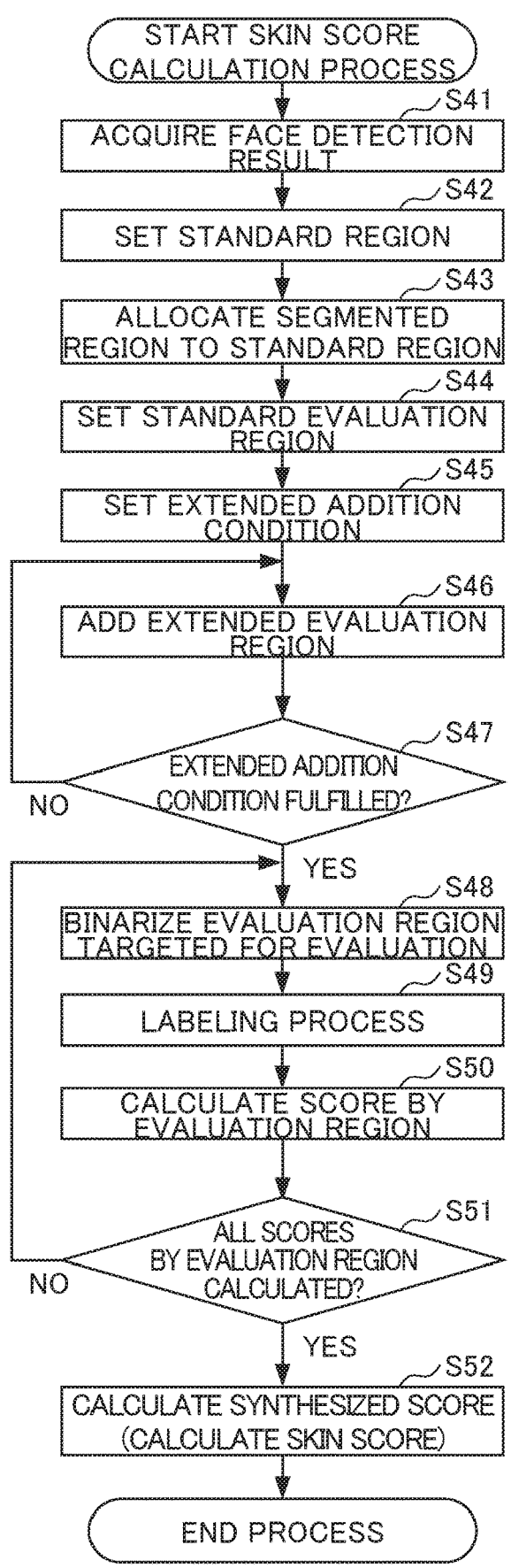
FIG. 6 is a flowchart illustrating a flow of a skin score calculation process, in relation to the secondary beautiful skin process.

FIG. 6 is a flowchart illustrating a flow of a skin score calculation process, among the secondary beautiful skin process.

In Step S41, the skin score calculation processing unit 53 acquires a face detection result such as the number of faces detected, a face frame, eye coordinates, nose coordinates, and mouth coordinates, which are the result of processing in Step S1. Note that the present step may be configured to detect a face afresh.

In Step S42, the skin score calculation processing unit 53 sets up a standard region excluding the region around the nose, in the region between the eyes and the mouth, based on the eye coordinates, the nose coordinates, and the mouth coordinates. Specifically, a region between the eyes and the mouth and a region around the nose as illustrated in FIG. 2A are set up based on the eye coordinates P1, P2, the nose coordinates P3, P4, and the mouth coordinates P5, P6 as illustrated in FIG. 2B; and a standard region R3 excluding the region around the nose is set up, in the region between the eyes and the mouth.

In Step S43, the skin score calculation processing unit 53 allocates segmented regions having a predetermined size in the standard region. The segmented regions are regions having a size segmented into thirty-two (32) pieces from the face frame. Specifically, as illustrated in FIG. 2C, a plurality of segmented regions RS having a predetermined size are allocated in the standard region R3.

In Step S44, the skin score calculation processing unit 53 sets up a standard evaluation region R10 targeted for evaluation, among the segmented regions RS allocated in the standard region R3. Specifically, a histogram of brightness is calculated from each standard evaluation region. In addition, a standard evaluation region is targeted for evaluation, when the standard deviation value thereof falls within a predetermined range, in which the mode of the histogram is at the center.

In Step S45, the skin score calculation processing unit 53 sets up an extended addition condition. The extended addition condition is set up such that the standard deviation does not exceed a threshold value that is a mean value +α (in the present embodiment, for example, 3) of the standard deviations in the standard evaluation region targeted for evaluation, and that the regions do not reach a predetermined number (in the present embodiment, for example, 50 regions).

In Step S46, the skin score calculation processing unit 53 adds an extended evaluation region. As illustrated in FIG. 2D, the extended evaluation region R11 is added by allocating segmented regions in parallel with the standard evaluation region R10. The extended evaluation region is added, if the number thereof falls within a predetermined number, and the standard deviation does not exceed a threshold value that is a mean value +α (in the present embodiment, for example, 3) of the standard deviations in the standard evaluation region.

In Step S47, the skin score calculation processing unit 53 determines whether the extended evaluation region fulfills the extended addition condition. Specifically, determination on the extended evaluation region is based on a fact that the standard deviation thereof does not exceed a threshold value which is a mean value +α (in the present embodiment, for example, 3) of the standard deviations in the standard evaluation region, and that the total number of the extended evaluation regions does not reach a predetermined number (in the present embodiment, for example, 50 regions). If the extended addition condition has not been fulfilled, the determination in Step S47 is NO, and the process returns to Step S46. If the extended addition condition has been fulfilled, the determination in Step S47 is YES, and the process advances to Step S48.

In Step S48, the skin score calculation processing unit 53 binarizes the evaluation regions targeted for evaluation (the standard evaluation region and the extended evaluation region). The evaluation regions are binarized, based on the threshold value that is set up based on the histogram of brightness in the evaluation regions.

In Step S49, the skin score calculation processing unit 53 performs a labeling process. As a result of the labeling process, regions of pores or freckles in the evaluation regions are classified. In the labeling process, as illustrated in FIGS. 3A and 3B, labels are assigned to pixels of the continuous portions darkened by binarization, and classified into the categories of pores or freckles having a predefined size, based on the sizes of the continuous regions Ra1, Ra2, Rb1 each composed of continuous pixels.

In Step S50, the skin score calculation processing unit 53 calculates a score by evaluation region. Specifically, the number of pores and freckles classified in the evaluation regions is counted, and the scores of the pores and freckles are calculated. In the evaluation region RA of FIG. 3A, two portions are classified into pores; and in the evaluation region RB of FIG. 3B, one portion is classified into freckles.

In Step S51, the skin score calculation processing unit 53 determines whether all scores by evaluation region have been calculated. If all scores by evaluation region have not been calculated, the determination in Step S51 is NO, and the process returns to Step S48. If all scores by evaluation region have been calculated, the determination in Step S51 is YES, and the process advances to Step S52.

In Step S52, the skin score calculation processing unit 53 calculates a synthesized score (skin score) of the inside of the face frame. Specifically, a synthesized score (skin score) of the inside of the face frame is calculated by counting all the scores by evaluation region.

The image capture apparatus 1 as thus configured is provided with the skin score calculation processing unit 53. The skin score calculation processing unit 53 segments the face region of the person included in the image into a plurality of segmented regions having a uniform size in a predetermined proportion to the size of the face region. Further, the skin score calculation processing unit 53 measures luminance values of a predetermined number of pixels, respectively. Further, the skin score calculation processing unit 53 determines a condition of at least any one of the pores and freckles in the face region, based on a distribution condition of the luminance values measured in the segmented region, for each of the segmented regions segmented. As a result, the image capture apparatus 1 can easily evaluate a condition of the skin (in particular, a condition of the freckles and pores) included in the image.

The skin score calculation processing unit 53 segments the face region into an equal number of a plurality of segmented regions having a uniform size in a predetermined proportion to the size of the face region, instead of the size of the face region. As a result, the image capture apparatus 1 can appropriately evaluate a condition of the skin (in particular, a condition of the freckles and pores) included in the image.

The skin score calculation processing unit 53 identifies skin segmented regions that do not include any site composing the face, among the segmented regions segmented. Further, the skin score calculation processing unit 53 measures luminance values of the skin segmented regions identified, respectively. Further, the skin score calculation processing unit 53 determines a condition of the skin in the face region, based on a distribution condition of the luminance values measured in each of the skin segmented regions measured. As a result, the image capture apparatus 1 can appropriately evaluate a condition of the skin (in particular, a condition of the freckles and pores).

The skin score calculation processing unit 53 identifies the skin segmented regions, based on at least any one position of the eyes, the nose and the mouth included in the face region. As a result, the image capture apparatus 1 can appropriately evaluate a condition of the skin (in particular, a condition of the freckles and pores).

The skin score calculation processing unit 53 first identifies a skin segmented region that is highly unlikely to include any site composing the face, and subsequently sequentially identifies a skin segmented region adjacent to the skin segmented region identified. As a result, the image capture apparatus 1 can evaluate a condition of the skin (in particular, a condition of the freckles and pores) with high accuracy.

If the luminance value is not more than a predetermined threshold value, and the proportion of the size of pixels of the continuous range in the segmented region is a predetermined proportion of the segmented region, the skin score calculation processing unit 53 determines the range to be at least one of pores or freckles. As a result, the image capture apparatus 1 can easily evaluate a condition of the skin (in particular, a condition of the freckles and pores).

A predetermined proportion determined to be freckles determined by the skin score calculation processing unit 53 is greater than a predetermined proportion determined to be pores. Note that determination may be configured to be made such that the predetermined proportion determined to be freckles is smaller than the predetermined proportion determined to be pores, at a duplicated value. As a result, the image capture apparatus 1 can easily evaluate a condition of the skin (in particular, a condition of the freckles and pores) included in the image.

Further, the skin score calculation processing unit 53 evaluates a condition of the skin in the face region by synthesized results of determined the condition of at least any one of the pores and freckles in each segmented region. As a result, the image capture apparatus 1 can easily evaluate a condition of the skin (in particular, a condition of the freckles and pores).

Further, the image capture apparatus 1 is further provided with the image processing unit 54 that performs a beautiful skin process on the face region, in accordance with a condition of the skin in the face region evaluated by an evaluation unit. As a result, the image capture apparatus 1 can perform a beautiful skin process in accordance with a condition of the skin (in particular, a condition of the freckles and pores).

The skin score calculation processing unit 53 segments the face region of the person included in the image into segmented regions having a size in a predetermined proportion to the size of the face region. Further, the skin score calculation processing unit 53 measures luminance values of a predetermined number of pixels, respectively. Further, the skin score calculation processing unit 53 identifies a size of a predetermined proportion segmented, in accordance with a value for determining at least any one of pores and freckles in the face region. The value for determination is a value indicating the predetermined proportion of the size of the continuous range in the segmented region, in which the luminance value measured by the skin score calculation processing unit 53 is not more than a predetermined threshold value. As a result, the image capture apparatus 1 can easily evaluate a condition of the skin (in particular, a condition of the freckles and pores) included in the image.

Note that the present invention is not limited to the above-described embodiment; and modifications, improvements, etc. within a range that allows the object of the invention to be achieved are included in the present invention.

In the above-described embodiment, the size of the segmented regions may be configured to be increased or decreased in accordance with a condition of the skin to be evaluated. For example, when evaluating a condition of flecks, moles, etc. which are different from pores and freckles, the size of the segmented regions may be configured to be increased. Specifically, the size of the segmented regions is increased or decreased in accordance with a typical size of the continuous region having low brightness. When the continuous regions are relatively larger, the number of segmentations is decreased (the size of the segmented regions is increased); and when the continuous regions are relatively smaller, the number of segmentations is increased (the size of the segmented regions is decreased).

Further, the above-described embodiment is configured to calculate scores after setting up a standard evaluation region and an extended evaluation region; however, it may be configured to secondarily set up an extended evaluation region or calculate scores, by factoring a result, reliability, etc. of the scores as necessary, after calculating the scores in the standard evaluation region.

Further, in the above-described embodiment, the processing target setting unit 52 is configured to set a face having the largest size among the unprocessed faces as a processing target; however, it may be configured to set a face nearest to the center of the image targeted for processing as a processing target.

Further, the above-described embodiment may be configured such that, when the skin score calculation processing unit 53 calculates a synthesized score (skin score) in the face frame, a process of reducing the score is applied if the face targeted for processing is dark, in consideration of influence of noise.

According to the above-described embodiment, a digital camera is shown as an example of the image capture apparatus 1 to which the present invention is applied. However, the image capture apparatus 1 is not particularly limited to a digital camera. For example, the present invention is applicable to common electronic devices having the function of the secondary beautiful skin process. More specifically, for example, the present invention is applicable to notebook personal computers, printers, television receivers, video cameras, portable navigation devices, portable telephones, smartphones, handheld game consoles, etc.

The above-described processing sequence can be executed by hardware or by software. In other words, the functional configuration shown in FIG. 4 is merely an illustrative example, and the present invention is not particularly limited to this configuration. Specifically, as long as the image capture apparatus 1 has a function enabling the above-described processing sequence to be executed in its entirety, the types of functional blocks employed to realize this function are not particularly limited to the example shown in FIG. 4. In addition, a single functional block may be configured by a hardware unit, by a software unit, or by combination of the hardware and software units. The functional configuration according to the present embodiment is realized by a processor to execute arithmetic processing. The processor applicable to the present invention includes processors formed of various processing units such as a single processor, a multiprocessor, and a multi-core processor, and processors formed of combinations between these processing units and processing circuits such as an application specific integrated circuit (ASIC) and a field-programmable gate array, for example.

If the processing sequence is to be executed by software, a program configuring the software is installed from a network or a storage medium into a computer, for example. The computer may be a computer embedded in dedicated hardware. Alternatively, the computer may be a general-purpose personal computer, for example, capable of executing various functions by means of installation of various programs.

The storage medium containing such programs can not only be constituted by the removable medium 31 shown in FIG. 1 distributed separately from an apparatus body in order to supply the programs to a user, but can also be constituted by a storage medium or the like supplied to the user in a state of being incorporated in the apparatus body in advance. The removable medium 31 is for example formed of a magnetic disk (including a floppy disk), an optical disk, or a magneto-optical disk. The optical disk is for example formed of a compact disk read-only memory (CD-ROM), a digital versatile disk (DVD), or a Blu-ray (registered trademark) Disk (Blu-ray Disk). The magneto-optical disk is for example formed of a Mini-Disk (MD). The storage medium, which is supplied to the user in a state of being incorporated in the apparatus body in advance, is for example formed of the ROM 12 shown in FIG. 1 storing a program or a hard disk included in the storage unit 19 shown in FIG. 1.

It should be noted that, in the present specification, the steps describing the program stored in the storage medium include not only processes executed in a time-series manner according to the order of the steps, but also processes executed in parallel or individually and not always required to be executed in a time-series manner.

While some embodiments of the present invention have been described above, these embodiments are merely exemplifications, and are not to limit the technical scope of the present invention. Various other embodiments can be employed for the present invention, and various modifications such as omissions and replacements are applicable without departing from the substance of the present invention. Such embodiments and modifications are included in the scope of the invention and the summary described in the present specification, and are included in the invention recited in the claims as well as in the equivalent scope thereof.

What is claimed is:

1. An image processing apparatus, comprising:
a processor configured to:
segment a face region of a person included in an image into a plurality of segmented regions having a uniform size in a predetermined proportion to a size of the face region;
measure luminance values of a predetermined number of pixels, respectively, in each of the segmented regions; and
determine whether at least one of pores and freckles exist in the face region, based on a distribution condition of the measured luminance values in each of the segmented regions,
wherein the processor is further configured to:
identify, as skin segmented regions, regions among the segmented regions that do not include any face identifying components,
measure the luminance values for each of the identified skin segmented regions; and
determine whether at least one of pores and freckles exist in the face region, based on a proportion of a region in each skin segmented region occupied by continuous pixels whose measured luminance values are lower than a predetermined threshold value, and
wherein the processor is configured to first identify a first skin segmented region that is highly unlikely to include any face identifying components, and to subsequently sequentially identify a skin segmented region adjacent to the first skin segmented region.

2. The image processing apparatus according to claim 1, wherein the processor is configured to segment the face region into an equal number of a plurality of segmented regions having a uniform size in a predetermined proportion to the size of the face region.

3. The image processing apparatus according to claim 1, wherein the face identifying components include at least one of the eyes, the nose, and the mouth included in the face region, and
wherein the processor identifies the skin segmented regions based on positions of the face identifying components.

4. The image processing apparatus according to claim 1, wherein the processor is configured to determine, in a case in which it is determined that at least one of the pores and the freckles exists in the face region, which of the at least one of the pores and the freckles exists in the face region, based on the proportion of the region in each skin segmented region occupied by continuous pixels whose measured luminance values are lower than the predetermined threshold value, and
wherein the proportion of the region used to determine the existence of the freckles is greater than the proportion of the region used to determine the existence of the pores.

5. The image processing apparatus according to claim 1, wherein the processor is further configured to:
determine whether at least one of the pores and the freckles exists in the face region, for each of the segmented regions; and
evaluate a condition of the skin in the face region based on a determination result.

6. The image processing apparatus according to claim 5, wherein the processor is further configured to perform a beautiful skin process on the face region, in accordance with the evaluated condition of the skin.

7. An image processing method, comprising:
- segmenting a face region of a person included in an image into a plurality of segmented regions having a uniform size in a predetermined proportion to a size of the face region;
- identifying, as skin segmented regions, regions among the segmented regions that do not include any face identifying components;
- measuring luminance values of a predetermined number of pixels, respectively, in each of the identified skin segmented regions; and
- determining whether at least one of pores and freckles exist in the face region, based on a proportion of a region in each segmented region occupied by continuous pixels whose measured luminance values are lower than a predetermined threshold value,
- wherein the identifying comprises first identifying a first skin segmented region that is highly unlikely to include any face identifying components, and to subsequently sequentially identify a skin segmented region adjacent to the first skin segmented region.

8. A non-transitory computer-readable recording medium storing a program thereon for causing the computer to execute processes comprising:
- a segmentation process that segments a face region of a person included in an image into a plurality of segmented regions having a uniform size in a predetermined proportion to a size of the face region;
- an identification process that identifies, as skin segmented regions, regions among the segmented regions that do not include any face identifying components;
- a measurement process that measures luminance values in unit; of a predetermined number of pixels, respectively, in each of the identified skin segmented regions; and
- a determination process that determines whether at least one of pores and freckles exist in the face region, based on a proportion of a region in each segmented region occupied by continuous pixels whose measured luminance values are lower than a predetermined threshold value,
- wherein the identification process comprises first identifying a first skin segmented region that is highly unlikely to include any face identifying components, and to subsequently sequentially identify a skin segmented region adjacent to the first skin segmented region.

* * * * *

UNITED STATES PATENT AND TRADEMARK OFFICE
CERTIFICATE OF CORRECTION

PATENT NO. : 10,713,793 B2
APPLICATION NO. : 15/822800
DATED : July 14, 2020
INVENTOR(S) : Kyosuke Sasaki Page 1 of 1

It is certified that error appears in the above-identified patent and that said Letters Patent is hereby corrected as shown below:

In the Claims

Column 16, Lines 11-12, delete "in unit;".

Signed and Sealed this
Twenty-seventh Day of October, 2020

Andrei Iancu
*Director of the United States Patent and Trademark Office*